United States Patent [19]

Ohe et al.

[11] Patent Number: 4,686,438
[45] Date of Patent: Aug. 11, 1987

[54] ELECTRIC POWER STEERING APPARATUS

[75] Inventors: Takeshi Ohe; Yoshiaki Taniguchi; Minoru Arai, all of Saitama, Japan

[73] Assignee: Jidosha Kiki Co., Ltd., Tokyo, Japan

[21] Appl. No.: 836,962

[22] Filed: Mar. 6, 1986

[30] Foreign Application Priority Data

Mar. 7, 1985 [JP] Japan .................................. 60-43959

[51] Int. Cl.$^4$ ...................... B62D 5/04; G05D 17/02; H02P 1/22
[52] U.S. Cl. .................................. 318/280; 318/293; 318/488; 318/489
[58] Field of Search ............... 318/256, 268, 280, 287, 318/288, 289, 291, 293, 294, 345 B, 345 F, 432, 488, 489, 2; 180/6.2, 6.28, 6.44, 6.48, 6.5, 79.1, 142, 145; 74/388 R, 388 PS; 363/132, 136

[56] References Cited

U.S. PATENT DOCUMENTS 4,296,361 10/1981 Archer .................................. 318/54
4,538,698 9/1985 Hashimoto et al. ............ 180/142 X
4,581,565 4/1986 Van Pelt et al. ..................... 318/294

Primary Examiner—William M. Shoop, Jr.
Assistant Examiner—Bentsu Ro
Attorney, Agent, or Firm—Blakely, Sokoloff, Taylor & Zafman

[57] ABSTRACT

An electric power steering apparatus causes a bridge circuit and a driver circuit to control normal and reverse rotation operations of a motor. The bridge circuit is constituted by transistors. The driver circuit is connected to a power source and also is connected to the bridge circuit so as to drive the bridge circuit. A diode is inserted between the power source and the bridge circuit, and the polarities of the diode are set such that a voltage at the bridge circuit is lower than that at the driver circuit.

5 Claims, 21 Drawing Figures

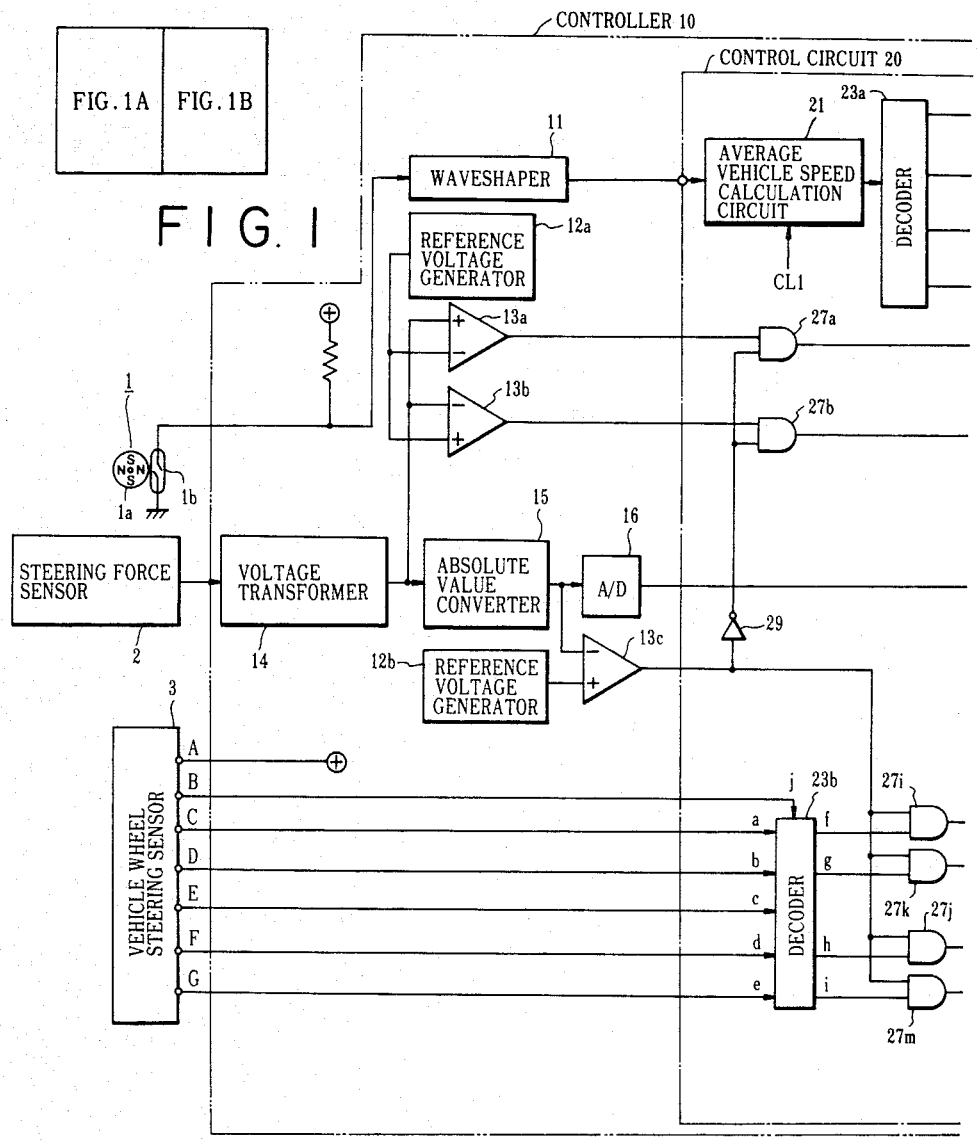

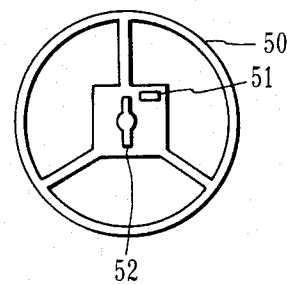
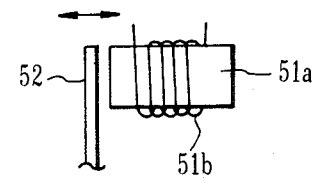
FIG.2  FIG.3
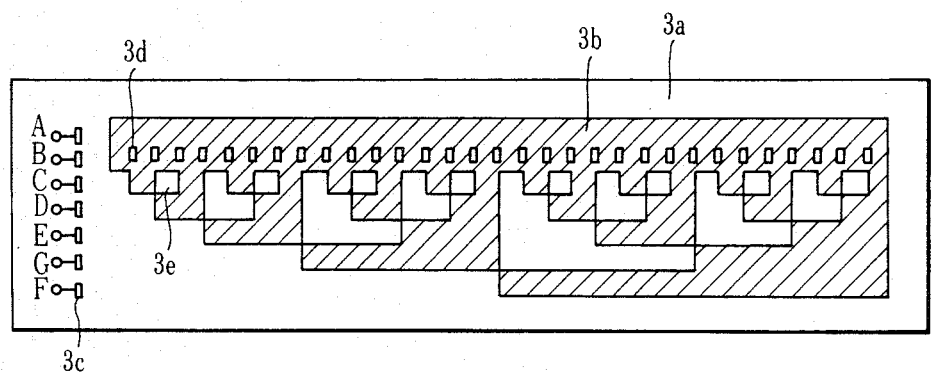
FIG.4

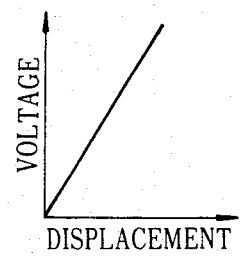
F I G.8A
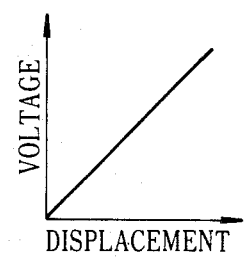
F I G.8B
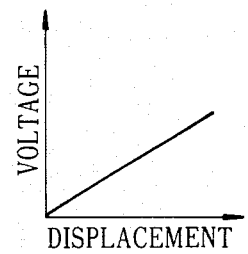
F I G.8C
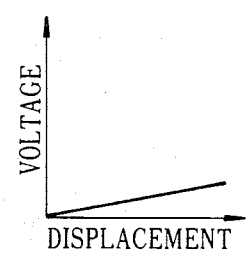
F I G.8D
F I G.9A (CL1)
F I G.9B (CL2)
F I G.9C (CL3)
F I G.9D (CL4)

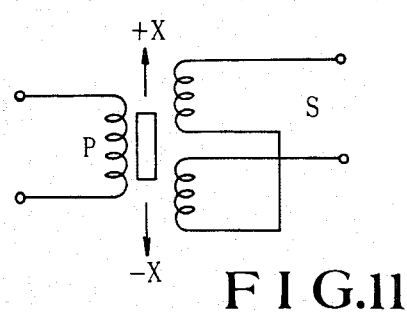
F I G.11
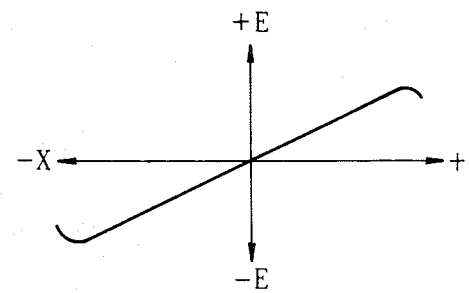
F I G.12
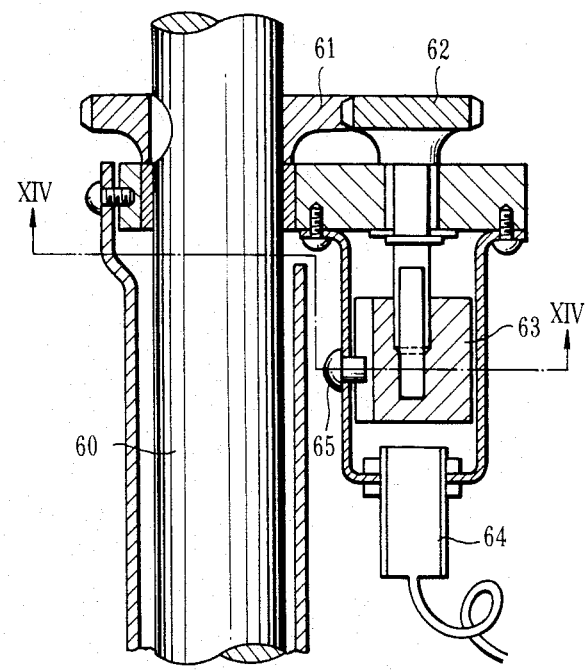
F I G.13
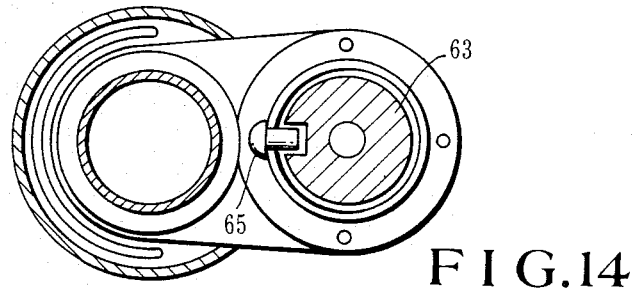
F I G.14

ELECTRIC POWER STEERING APPARATUS

BACKGROUND OF THE INVENTION

The present invention relates to an electric power steering apparatus using a motor rotational force as auxiliary power.

A conventional power steering apparatus using a motor rotational force as an auxiliary power source is described in Japanese Utility Model Publication No. 59-17759. In this apparatus, a motor is driven by a bridge circuit consisting of switching elements, and a drive circuit determines which one of pairs of opposite sides of the bridge circuit is driven. However, in this conventional apparatus, when motor power is increased, operation thereof becomes unstable.

SUMMARY OF THE INVENTION

It is, therefore, a principal object of the present invention to provide an electric power steering apparatus for providing stable steering operation, even if a high-power motor is used.

In order to achieve the above object of the present invention, there is provided an electric power steering apparatus for causing a bridge circuit and a driver circuit to control normal and reverse rotation operations of a motor, the bridge circuit being constituted by switching elements, and the driver circuit being connected to a power source connected to the bridge circuit and being adapted to drive the bridge circuit, wherein a voltage drop element is inserted in a power source path between the bridge and driver circuits, and polarities of the voltage drop element are set such that a voltage at the bridge circuit is lower than that at the driver circuit.

BRIEF DESCRIPTION OF THE DRAWINGS

FIGS. 1A and 1B are block diagrams of an electric power steering apparatus according to an embodiment of the present invention;

FIG. 2 is a schematic view showing a mounting state of a steering force sensor;

FIG. 3 is a schematic view for explaining the principle of operation of a gap sensor;

FIG. 4 is a plan view of a vehicle wheel steering angle sensor;

FIGS. 8A to 8D are graphs showing input/output characteristics of pattern memories;

FIGS. 9A to 9D are timing charts of output signals from a clock signal generator;

FIG. 11 is a circuit diagram of a differential transformer;

FIG. 12 is a graph showing characteristics when a differential transformer is used as a vehicle wheel steering angle sensor;

FIG. 13 is a sectional view of the gap sensor mounted on a column shaft when the gap sensor is used as a vehicle wheel steering angle sensor; and FIG. 14 is a sectional view of the structure of FIG. 13 taken along the line XIV—XIV.

DESCRIPTION OF THE PREFERRED EMBODIMENT

Figure 1B:
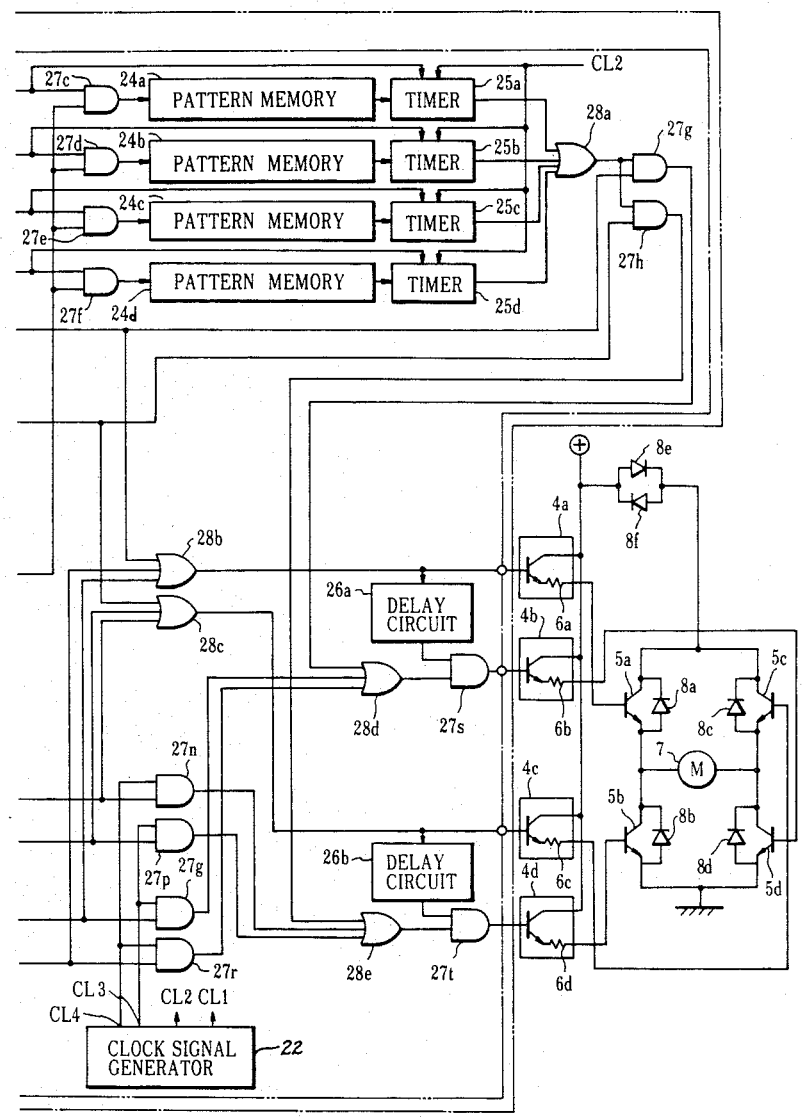

FIG. 1 is a block diagram of an electric power steering apparatus according to an embodiment of the present invention. Referring to FIG. 1, reference numeral 1 denotes a vehicle speed sensor consisting of a magnetic disk 1a rotated together with an axle, and a reed switch 1b; 2, a steering force sensor for detecting a steering torque; 3, a vehicle wheel steering angle sensor as a means for detecting a steering angle of vehicle wheels; 4a to 4d and 5a to 5d, transistors; 6a to 6d, resistors; 7, a motor; 8a to 8f, diodes; and 10, a controller for controlling a current supplied to the motor 7 in response to vehicle speed, steering force, and steering angle detection signals.

The controller 10 has a wave shaper 11, reference voltage generators 12a and 12b, comparators 13a to 13c, a voltage transformer 14, an absolute value converter 15, an A/D converter 16, and a control circuit 20. The control circuit 20 has an average vehicle speed calculation circuit 21, a clock signal generator 22, decoders 23a and 23b, pattern memories 24a to 24d, timers 25a to 25d, delay circuits 26a and 26b, AND gates 27a to 27t, OR gates 28a to 28e, and an inverter 29.

As shown in FIG. 2, the steering force sensor 2 has a gap sensor 51 rotated together with a steering wheel 50 and an iron member 52 of a magnetic material, which is rotated together with a column shaft (not shown). As shown in FIG. 3, the gap sensor 51 has an iron core 51a wound with a coil 51b. When a driver turns the steering wheel 50, the iron core 51a comes close to, or moves away from, the iron member 52 mounted on the column shaft, so that a change in reluctance indicates the size of a gap between the iron member 52 and the iron core 51a.

Figure 5:
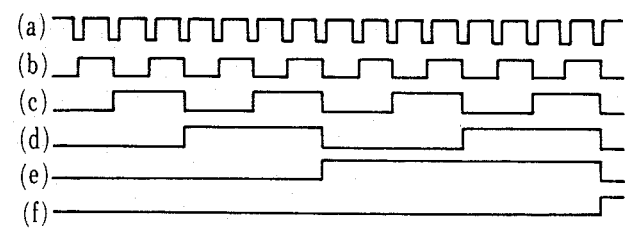
FIG. 5 is timing charts of output signals from the vehicle wheel steering angle sensor shown in FIG. 4.

As shown in FIG. 4, the vehicle wheel steering angle sensor 3 has an electrode 3b printed on a board 3a, and seven sliders 3c slidably mounted along the electrode 3b. The sliders 3c are interlocked with each other and slide on the electrode 3b in the right-and-left directions. The electrode 3b has slits 3d formed in portions slidably contacting the slider 3c connected to a terminal B, and slits 3e formed in portions slidably contacting the sliders 3c connected to terminals C to G. The board 3a is fixed on the vehicle body, and the sliders 3c are moved together with a tie rod (not shown) for controlling a steering direction. The conductive states of the terminal A and the terminals B to G are changed, as shown in FIG. 5.

A tie rod position, i.e., the vehicle wheel steering angle, can be detected by output signals from these terminals.

Figure 6:
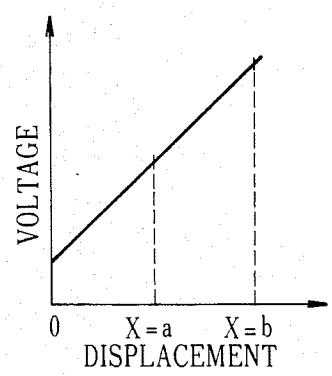
FIG. 6 is a graph showing input/output characteristics of a voltage converter shown in FIG. 1.
Figure 7:
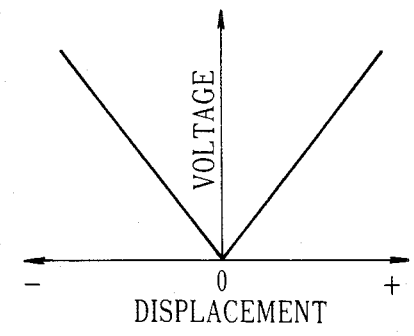
FIG. 7 is a graph showing input/output characteristics of an absolute value converter.

The voltage transformer 14 converts a change in reluctance of the gap sensor 51 to a voltage signal proportional to the size of the gap between the iron core 51a and the iron member 52 (FIG. 6). The size of the gap is represented by the displacement x in FIG. 6. A point x=a represents a straight steering wheel position where no torque is applied to the steering wheel. A point x=0 represents a position where the steering wheel is turned with maximum torque to the left such that the size of the gap and the corresponding voltage signal are at their minimum values. A point x=b represents a position where the steering wheel is turned with maximum torque to the right such that the size of the gap and the corresponding voltage signal are at their maximum values. The absolute value converter 15 changes the voltage transformer's voltage signal shown in FIG. 6 to a signal in which the voltage is proportional to the absolute value of the change in the size of the gap from its equilibrium value $x=a$. This signal is shown in FIG. 7, in which the Displacement represents the change in the size of the gap from its equilibrium value. A positive displacement represents a right steering torque, and a negative displacement represents a left steering torque. Both positive and negative displacements of equal magnitude produce the same output voltage. When a magnitude of the signal supplied from the absolute value converter 15 is smaller than that of the signal supplied from the reference voltage generator 12b, the comparator 13c generates a signal of logic "1", which represents a non-steering state. The voltage transformer 14, the absolute value converter 15, and the comparator 13c constitute a means for detecting a non-steering state.

The pattern memories 24a to 24d store duty ratios of currents supplied to the motor 7 in correspondence with the steering torques. As shown in FIGS. 8A to 8D, four duty ratio characteristics are respectively stored in the pattern memories 24a to 24d. Referring to FIGS. 8A to 8D, the steering torque is plotted along the abscissa, and the duty ratio data of current supplied to the motor 7 is plotted along the ordinate. FIG. 8A shows duty ratio characteristics at a low vehicle speed, in which an increasing duty ratio increases an output torque of the motor 7. The duty ratios in FIGS. 8B to 8D gradually decrease, thus decreasing the output torques of the motor 7.

One of the timers 25a to 25d is selected by the decoder 23a in response to a clock signal CL2 from the clock generator 22, and generates a signal of logic "1" for a predetermined period of time. When a period of time determined by a signal from a selected one of the pattern memories 24a and 24d has passed, the timer is reset so that its output level is reset to level "0".

The decoder 23b decodes the signals supplied to its terminals a to e and generates a decoded result at one of its terminals f to i. When a terminal j is set at level "0", the immediately preceding decoded result is stored and output irrespective of the signals supplied to the terminals a to e. When the terminal j is updated to level "1", the signals supplied to the terminals a to e are again decoded. The clock signal generator 22 generates clock signals shown in FIGS. 9A to 9D.

The right steering mode of the apparatus with the arrangement described above will be described first. A vehicle speed signal is generated by the vehicle speed sensor 1 while the vehicle is being driven. This signal is wave-shaped by the wave shaper 11 and is then converted by the average vehicle speed calculation circuit 21 to an average vehicle speed signal. The average vehicle speed signal is decoded by the decoder 23a to obtain an output representing one of the speed ranges from a low speed range to a high speed range. The signal of logic "1" appears at one of the output terminals of the decoder 23a in accordance with the content of the decoded result.

Since steering is performed in this case, a steering torque detected by the steering force sensor 2 is transformed by the voltage transformer 14 to a voltage signal. The voltage signal is supplied through the absolute value converter 15 to the A/D converter 16, where it is converted to a corresponding digital signal. This digital signal is supplied to AND gates 27c to 27f.

One of these AND gates also receives the signal of logic "1" from the decoder 23a. The signal from the A/D converter 16 is thus supplied to a corresponding one of the AND gates 27c to 27f, which is selected by the decoder 23a. For example, when the vehicle speed falls within a lowest vehicle speed range, the memory 24a, for storing the duty ratio characteristics in FIG. 8A, is selected. When the vehicle speed falls within the highest vehicle speed range, the pattern memory 24d, for storing the characteristics shown in FIG. 8D, is selected.

When one of the pattern memories 24a to 24d is selected, a signal corresponding to the detected steering torque is read out from the selected pattern memory, and the readout signal is supplied to the timers 25a to 25d. The timers generate signals representing the vehicle velocity and the steering torque. One of the timers 25a to 25d, which is selected by the decoder 23a, generates an output signal in response to the clock signal CL2, and the timer is disabled when a period of time determined by the signal read out from the selected pattern memory has elapsed.

The output from the voltage transformer 14 is supplied to the comparators 13a and 13b and is compared thereby with a signal supplied from the reference voltage generator 12a. If an output level of the reference voltage generator 12a is set to be the one corresponding to a displacement at the position $x=a$ in FIG. 6, the comparator 13a generates a signal of logic "1". Since the comparator 13c generates a signal of logic "0" during steering, this signal is inverted by the inverter 29 to a signal of logic "1". This signal is then supplied to the AND gates 27a and 27b. The AND gate 27a generates a signal of logic "1" during steering in the right direction.

The signal from the AND gate 27a is supplied to turn on the transistors 4a and 5a through the OR gate 28b. The output from the AND gate 27a is also delayed by the delay circuit 26a for a predetermined period of time. The delayed signal is then supplied to the AND gate 27s. An output from the AND gate 27a is also supplied to the AND gate 27g, and an output from the OR gate 28a is supplied to the AND gate 27s through the AND gate 27g and the OR gate 28d. The transistors 4b and 5d are thus turned on, and a current is supplied to the motor 7 in a left to right direction. A torque generated by the motor 7 upon its operation is used for steering. As stated previously, the duty ratio determined by the signal selectively read out from the pattern memories 24a to 24d is proportional to the steering torque. The average value of the current supplied to the motor 7 increases when the steering torque is increased and as a result, the torque of the motor 7 is increased.

When the motor 7 is of a high-power type, a starting current supplied thereto is very large. In a conventional arrangement, a power source for supplying power to the transistors 4a to 4d, constituting a driver circuit, is commonly connected to a power source for supplying power to the transistors 5a to 5d, constituting a bridge circuit, and voltages at the driver and bridge circuits are greatly decreased when a starting current is supplied thereto. The operation of the transistors 5a to 5d is subsequently unstable. More specifically, in PWM control with a rectangular wave, the motor repeats ON-/OFF operations at high speed. The unstable operation of the transistors 5a to 5d induces oscillation, resulting in a control failure and excessive shortening of transistor lifetime. According to the extensive studies of the present inventor, it was found that the circuit operates stably when power is supplied to the transistors 5a to 5d through the diode 8e, as shown in FIG. 1, for the following reason: when the starting current is supplied to the motor 7, the power source voltage is decreased. However, a current is supplied to the bridge circuit through the diode 8e, the bridge circuit receives a voltage lower (by a forward-bias drop component of the diode 8e) than that received by the driver circuit. Similarly, a voltage supplied to the motor 7 is also decreased by the forward-biased voltage drop across the diode 8e. This forward-biased voltage drop is abruptly increased when a current supplied to the diode 8e is larger than a predetermined value. When a starting current is supplied to the diode 8e, the forward-biased voltage drop is increased. For this reason, a voltage higher than that supplied to the bridge circuit is supplied to the driver circuit even upon flow of the starting current. A sufficient base current is supplied to the transistors of the bridge circuit. When rotation of the motor 7 is started, the current supplied thereto is smaller than the rising current. The forward-biased voltage drop of the diode 8e is then decreased, so that a voltage required for rotating the motor 7 is supplied thereto. The diode 8f is a circuit protection flywheel diode.

When turning to the right is completed and a steering torque which has acted on the steering wheel is eliminated, the comparator 13c generates a signal of logic "1". This signal is inverted by the inverter 29, and then a signal of logic "0" is supplied to the AND gate 27a. For this reason, the output signal from the AND gate 27a goes from logic "1" to logic "0", and the signals of logic "1" from the OR gate 28b and the AND gate 27s are updated from logic "1" to logic "0". Therefore, the current is no longer supplied to the motor 7.

In this state, the vehicle is normally restored to the straight steering state due to a self-aligning torque. Along with this, the steering wheel is returned to its initial state, i.e., a position prior to an application of the steering torque. However, when steering is performed using the rotational force of the motor, the steering wheel is not sufficiently returned to the straight steering position. This problem is solved in the following manner.

During turning of the vehicle, the vehicle wheel steering angle sensor 3 generates a signal corresponding to a vehicle wheel steering angle from the terminals B to G. This signal is decoded by the decoder 23b. When right turning is performed, a signal of logic "1" appears at the terminal f or g. However, when left turning is performed, a signal of logic "1" appears at the terminal h or i. More specifically, the vehicle wheel steering angles are divided into wide and narrow steering angle ranges. When a vehicle wheel steering angle falls within the wide range, an output signal appears at the terminal f or i. However, when the vehicle wheel steering angle falls within the narrow range, an output signal appears at the terminal g or h.

When steering is performed in the normal driving state, the vehicle wheel steering angle falls within the narrow range. Assume that a right-steering state is changed to the non-steering state and that the vehicle wheel steering angle falls within the narrow range. A signal of logic "1" appears at the terminal g of the decoder 23b. Since the non-steering state is obtained, the comparator 13c generates a signal of logic "1" and the output signal from the decoder 23b is produced through the AND gate 27k. This signal is output through the OR gate 28c to turn on the transistors 4c and 5c and is then delayed by the delayed circuit 26b for the predetermined period of time. The delayed signal is then supplied to the AND gate 27t.

The signal from the AND gate 27k is also supplied to the AND gate 27p, and a clock signal CL3 is supplied to the AND gate 27t through the AND gate 27p and the OR gate 28e. Since the AND gate 27t receives the signal from the delay circuit 26b, the signal supplied from the OR gate 28e to the AND gate 27t is supplied to the transistor 4d, and the transistors 4d and 5b are turned on. A current is supplied to the motor 7 from the right to the left direction, as opposed to the current supply direction for right steering. Therefore, the motor 7 is rotated in a direction opposite that for right steering.

A magnitude of the torque generated by the motor 7 is sufficiently small as compared with a steering magnitude since it only cancels the self-aligning torque. For this reason, an average value of a current supplied to the motor 7 is also small. In this case, the duty ratio of the clock signal CL3 is sufficiently smaller than the steering duty ratio.

By supplying the current to the motor 7 in a direction opposite to that of the steering current, a force against the self-aligning torque, based on the use of a motor, can be cancelled. A change from the steered state to the straight state can be smoothly performed by the self-aligning torque, and the driver experiences a smooth transition from the steered state to the straight state.

As shown in FIG. 4, the vehicle wheel steering angle sensor 3 is operated such that the contact states between the terminal A and one of the terminals B to G are changed in accordance with the binary notation. When the sliders 3c are located at boundaries where the contact states are about to change, the output signals are indeterminate. When the vehicle wheel steering angle sensor 3 is vibrated, the outputs are unstable. Such unstable operation is prevented by this embodiment in the following manner. When the slider connected to the terminal B reaches a slit 3d, and an output signal is not generated by the slider connected to the terminal B, the decoder 23b retains the immediately preceding signal state. When the signal is generated by the slider connected to the terminal B, the input data is decoded. For this reason, a stable output can be obtained at a boundary where the resistance is changed.

When the self-aligning torque is used to return the steering wheel to the straight state, no signal appears at the terminals f to i of the decoder 23b. The outputs from the AND gates 27i to 27m, 27n to 27r, the OR gates 28d and 28e, and the AND gates 27s and 27t are set at logic "0", so that the motor 7 is de-energized.

The above description is made for right steering. Left steering can also be performed in the same manner as described above. In that case, the direction of current supplied to the motor 7 is reversed.

When the vehicle wheel steering angle falls within the wide range, i.e., a steering angle is large, the vehicle speed is normally low, and the corresponding self-aligning torque is small. The torque generated by the motor 7 is increased to compensate for the weakness of the self-aligning torque. When the decoder 23b detects that the vehicle wheel steering angle falls within the wide range, a signal of logic "1" is generated by the AND gate 27i or 27m, and the AND gate 27n or 27r gates a clock signal CL4. The clock signal CL4 has a larger duty ratio than that of the clock signal CL3, and thereby, the output torque from the motor 7 is increased.

Figure 10:
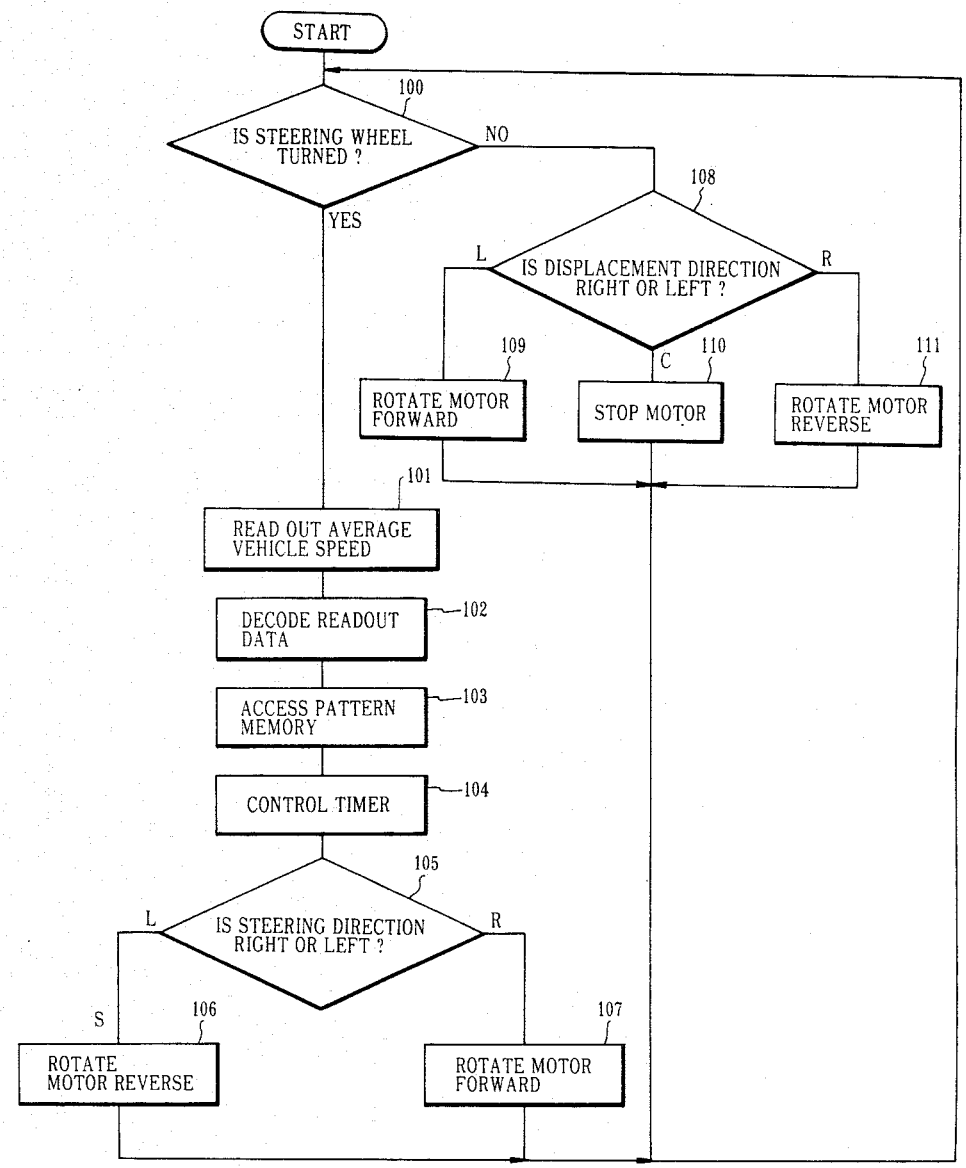
FIG. 10 is a flow chart for explaining power steering operation when the apparatus shown in FIG. 1 is constituted by a microprocessor.

FIG. 10 is a flow chart for explaining the above operation under the control of a microprocessor. The following table shows the relationships between the steps of FIG. 10 and the main components of the apparatus of FIG. 1. Referring to FIG. 10, reference numerals R, L, and C denote right, left, and center, respectively.

| Step | Corresponding Parts in FIG. 1 |
| --- | --- |
| 100 | Comparator 13c |
| 101 | Average vehicle speed calculation circuit 21 |
| 102 | Decoder 23a |
| 103 | Pattern memories 24a to 24d |
| 104 | Timers 25a to 25d |
| 105 | Comparators 13a & 13b |
| 106, 107 | AND gates 27g & 27h |
| 108 | Decoder 23b |
| 109, 110, 111 | AND gates 27i to 27m |

Instead of the contact type sensor in FIG. 4, the vehicle wheel steering angle sensor 3 may be constituted by a non-contact type sensor with a differential transformer, as shown in FIG. 11. In the differential transformer, a coil is mounted on the vehicle body, and a movable core is mounted on a tie rod to obtain the characteristics shown in FIG. 12.

FIG. 13 shows another non-contact type sensor. A rotational force of a column shaft 60 is converted to vertical linear movement of a magnetic member 63 through gears 61 and 62. A positional change in the magnetic member 63 is detected by a gap sensor 64. FIG. 14 is a sectional view of the sensor of FIG. 13 taken along the line XIV—XIV. The magnetic member 63 is guided by a boss 65.

According to the present invention described above, a diode is inserted in a power source path between the bridge circuit and the driver circuit. Even if a high-power motor is used, stable operation can be provided.

What is claimed is:

1. An electric power steering apparatus for causing a bridge circuit and a driver circuit to control normal and reverse operations of a motor, said bridge circuit comprising switching elements and having a first power input terminal, said driver circuit having a second power input terminal connected to a power source, said driver circuit being adapted to drive said bridge circuit, wherein a voltage drop element having a non-linear current-to-voltage characteristic is connected between said power source and said first power input terminal such that a voltage at said first power input terminal is lower than that at said second power input terminal.

2. An apparatus according to claim 1, wherein said voltage drop element comprises a diode.

3. An apparatus according to claim 2, wherein voltages at said first and second power input terminals have a difference corresponding to a forward-biased voltage drop component of said diode.

4. An apparatus according to claim 3, wherein said switching elements include transistors.

5. An electric power steering apparatus for controlling normal and reverse rotation operation of a motor comprising:
 a power source;
 a bridge circuit comprising switch elements connected with said motor and a first power input terminal for receiving power from said power source;
 a driver circuit which drives said bridge circuit and has a second power input terminal connected with said power source;
 a first diode having one terminal connected with said power source and the other terminal connected with said first power input terminal so that a voltage at said first power input terminal is lower than that at said second power input terminal by an amount corresponding to a forward-biased voltage drop component of said first diode; and
 a second diode connected between said power source and said first power input terminal parallel to said first diode but with its polarity reversed.

* * * * *

UNITED STATES PATENT AND TRADEMARK OFFICE
CERTIFICATE OF CORRECTION

PATENT NO. : 4,686,438

DATED : August 11, 1987

INVENTOR(S) : Ohe et al.

It is certified that error appears in the above-identified patent and that said Letters Patent is hereby corrected as shown below:

ON THE TITLE PAGE ITEM [30]

-- [30]　　In the Foreign Application Priority Data section please delete "Mar. 7, 1985 [JP] Japan......... 60-43959" and insert in lieu thereof --Mar. 7, 1985 [JP] Japan... 60-43595--.

Signed and Sealed this

Twenty-ninth Day of March, 1988

Attest:

DONALD J. QUIGG

*Attesting Officer*　　　　　　　　*Commissioner of Patents and Trademarks*